(12) United States Patent
Hung et al.

(10) Patent No.: US 8,253,350 B2
(45) Date of Patent: Aug. 28, 2012

(54) OPEN LOOP LED DRIVING CIRCUIT

(75) Inventors: Chia-Chien Hung, Hsin-Chu (TW);
Yen-Hui Wang, Hsin-Chu (TW);
Ko-Yen Lee, Hsin-Chu (TW)

(73) Assignee: Grenergy Opto, Inc., Hsin-Chu (TW)

( * ) Notice: Subject to any disclaimer, the term of this patent is extended or adjusted under 35 U.S.C. 154(b) by 436 days.

(21) Appl. No.: 12/560,790

(22) Filed: Sep. 16, 2009

(65) Prior Publication Data
US 2011/0062886 A1 Mar. 17, 2011

(51) Int. Cl.
*G05F 1/00* (2006.01)
(52) U.S. Cl. ............ 315/294; 315/291; 315/200 R; 315/206; 363/20; 363/21
(58) Field of Classification Search ............ 315/200 R, 315/206, 224, 247, 287, 288, 291; 363/20, 363/21, 41
See application file for complete search history.

(56) References Cited

U.S. PATENT DOCUMENTS

| | | | | |
|---|---|---|---|---|
| 6,888,383 B1* | 5/2005 | Fairbanks | | 327/124 |
| 6,943,504 B1* | 9/2005 | York | | 315/224 |
| 6,972,530 B1* | 12/2005 | Xin-LeBlanc | | 315/224 |
| 2010/0237920 A1* | 9/2010 | Wang et al. | | 327/176 |
| 2011/0101877 A1* | 5/2011 | Zhan et al. | | 315/206 |

* cited by examiner

*Primary Examiner* — Vibol Tan
(74) *Attorney, Agent, or Firm* — Muncy, Geisller, Olds & Lowe, PLLC

(57) ABSTRACT

The present invention discloses an open loop LED driving circuit, having a turn-on period and a turn-off period, the circuit comprising: a power stage, used to store a magnetic energy supplied from a voltage source during the turn-on period and deliver the magnetic energy to a set of LEDs during the turn-off period; and a control unit, having a turn-off period control terminal coupled to the voltage source, and a channel of which a first terminal is coupled to the power stage and a second terminal is coupled to a reference ground, wherein the channel is switched on at a time according to the voltage of the voltage source to determine the turn-off period.

6 Claims, 5 Drawing Sheets

OPEN LOOP LED DRIVING CIRCUIT

BACKGROUND OF THE INVENTION

1. Field of the Invention

The present invention relates to LED driving circuits, and more particularly to open loop LED driving circuits capable of delivering constant average current to a set of LEDs, irrespective of line voltage variations.

2. Description of the Related Art

In supplying power for a LED (Light Emitting Diode) module, open loop switching power conversion architecture is widely adopted due to cost issue. The open loop switching power conversion features a concise circuit topology by eliminating the transformer and the voltage feedback network.

FIG. 1 shows the architecture of a prior art open loop LED driving circuit. As shown in FIG. 1, the architecture includes: a PWM controller 100, a capacitor 101, a diode 102, a LED module 103, an inductor 104, an NMOS transistor 105, and resistors 106~107.

In the architecture of the prior art open loop LED driving circuit, the PWM controller 100 is used for generating a PWM signal with a duty cycle at the GATE pin in response to a current sensing voltage at the CS pin.

The capacitor 101 is used to filter out the high frequency components from a voltage source $V_{IN}$ to generate a DC voltage, wherein the voltage source $V_{IN}$ is rectified from an AC line voltage.

The diode 102 is used for releasing the magnetic flux in the inductor 104 to drive the LED module 103.

The LED module 103 is the load of the open loop LED driving circuit.

The inductor 104 is used for carrying the magnetic flux to provide a current $I_{LED}$ to drive the LED module 103.

The NMOS transistor 105 is used to control the magnetic flux transformation through the inductor 104 in response to the PWM signal at the GATE pin. When the NMOS transistor 105 is during a turn-on period, the LED module 103, the inductor 104, the NMOS transistor 105, and the resistor 106 will constitute a conduction path to store the magnetic flux in the inductor 104; when the NMOS transistor 105 is during a turn-off period, a conduction path composed of the LED module 103, the inductor 104, and the diode 102 will be formed to release the magnetic flux from the inductor 104.

Through a periodic on-and-off switching of the NMOS transistor 105, which is driven by the PWM signal generated from the PWM controller 100, the input power from the voltage source $V_{IN}$ is transformed through the inductor 104 to the LED module 103 in the form of a regulated current.

The resistor 106, connected between the CS pin of the PWM controller 100 and a reference ground, is used for converting the current, which corresponds to the magnetic flux being stored in the inductor 104, to the current sensing voltage at the CS pin when the NMOS transistor 105 is during a turn-on period.

The resistor 107, connected between the RT pin of the PWM controller 100 and the reference ground, is used to configure the PWM controller 100 to operate in a constant frequency mode.

Due to the on-and-off switching of the NMOS transistor 105, the current $I_{LED}$ is increasing during the turn-on period and decreasing during the turn-off period. Please refer to FIG. 2, which shows the waveform diagram of the LED driving current $I_{LED}$ of the prior art open loop LED driving circuit in FIG. 1, corresponding to a voltage source $V_{IN}$. As can be seen in FIG. 2, when the current $I_{LED}$ ramping up in a turn-on period reaches Vth/Rcs, which is set by the PWM controller 100, the NMOS transistor 105 is turned off and the current $I_{LED}$ starts to ramp down into a turn-off period Toff. The current $I_{LED}$ has an up-going slope mch in the turn-on period and a down-going slope mdis in the turn-off period, with mch=$(V_{IN}-V_O)$/L and mdis=$(V_O+V_{D1})$/L, wherein $V_O$ is the voltage dropt of the LED module 103, and $V_{D1}$ is the forward voltage dropt of the diode 102. The average current of the current $I_{LED}$ is thus calculated as:

$$I_{LED,avg} = Vth/Rcs - Toff \times mdis/2.$$

Ideally the average current $I_{LED,avg}$ is independent of the voltage of the voltage source $V_{IN}$. However, since there exists a delay time in switching off the NMOS transistor 105, the current $I_{LED}$ will exceed the Vth/Rcs with an amount equal to the product of the delay time and the up-going slope mch; and since the up-going slope mch depends on the voltage source $V_{IN}$, the peak current and so the average current of the current $I_{LED}$ will no longer remain constant when the voltage source $V_{IN}$ is changed to a different one. Besides, if the capacitance of the capacitor 101 is reduced or the capacitor 101 is just simply removed due to cost reduction issue, the voltage sources corresponding to different AC line voltages will exhibit unfiltered waveforms and cause more severe variations to the average current $I_{LED,avg}$. The reason is that when the voltage source $V_{IN}$ shows an unfiltered full-wave rectified waveform, there will be a dead time in the conduction of the diode 102, and the dead time, inversely proportional to the voltage of the line voltage, will reduce the average current $I_{LED,avg}$. Please refer to FIG. 3, which shows the waveform diagram of a LED driving current $I_{LEDL}$ corresponding to a higher voltage source $V_{INH}$ compared with another LED driving current $I_{LEDL}$ corresponding to a lower voltage source $V_{INL}$. As can be seen in FIG. 3, the dead time of the higher voltage source $V_{INH}$ during when the voltage of $V_{INH}$ is under $V_O$ is shorter than that of the lower voltage source $V_{INL}$, so the average current of $I_{LEDH}$ is larger than that of $I_{LEDL}$. That is, line voltage variations can cause luminance variations of the LED module.

Therefore, there is a need to provide a robust solution for the open loop LED driving circuit to regulate the driving current against line voltage variations.

Seeing this bottleneck, the present invention proposes a novel open loop LED driving circuit, capable of adaptively adjusting the turn-off period in response to line voltage variations to regulate the driving current.

SUMMARY OF THE INVENTION

The primary objective of the present invention is to propose an open loop LED driving circuit, capable of providing a constant average driving current irrespective of line voltage variations.

Another objective of the present invention is to propose a robust open loop LED driving circuit with concise structure, capable of adaptively adjusting the turn-off period of the power switch in response to line voltage variations to regulate the average of the driving current at a constant level.

To achieve the foregoing objectives of the present invention, a novel open loop LED driving circuit is proposed, the circuit comprising: a power stage, used to store a magnetic energy supplied from a voltage source during a turn-on period and deliver the magnetic energy to a set of LEDs during a turn-off period; and a control unit, having a turn-off period control terminal coupled to the voltage source, and a channel of which a first terminal is coupled to the power stage and a second terminal is coupled to a reference ground, wherein the channel is switched on at a time according to the voltage of the voltage source to determine the turn-off period.

To make it easier for our examiner to understand the objective of the invention, its structure, innovative features, and performance, we use a preferred embodiment together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiment of the invention.

Figure 1:
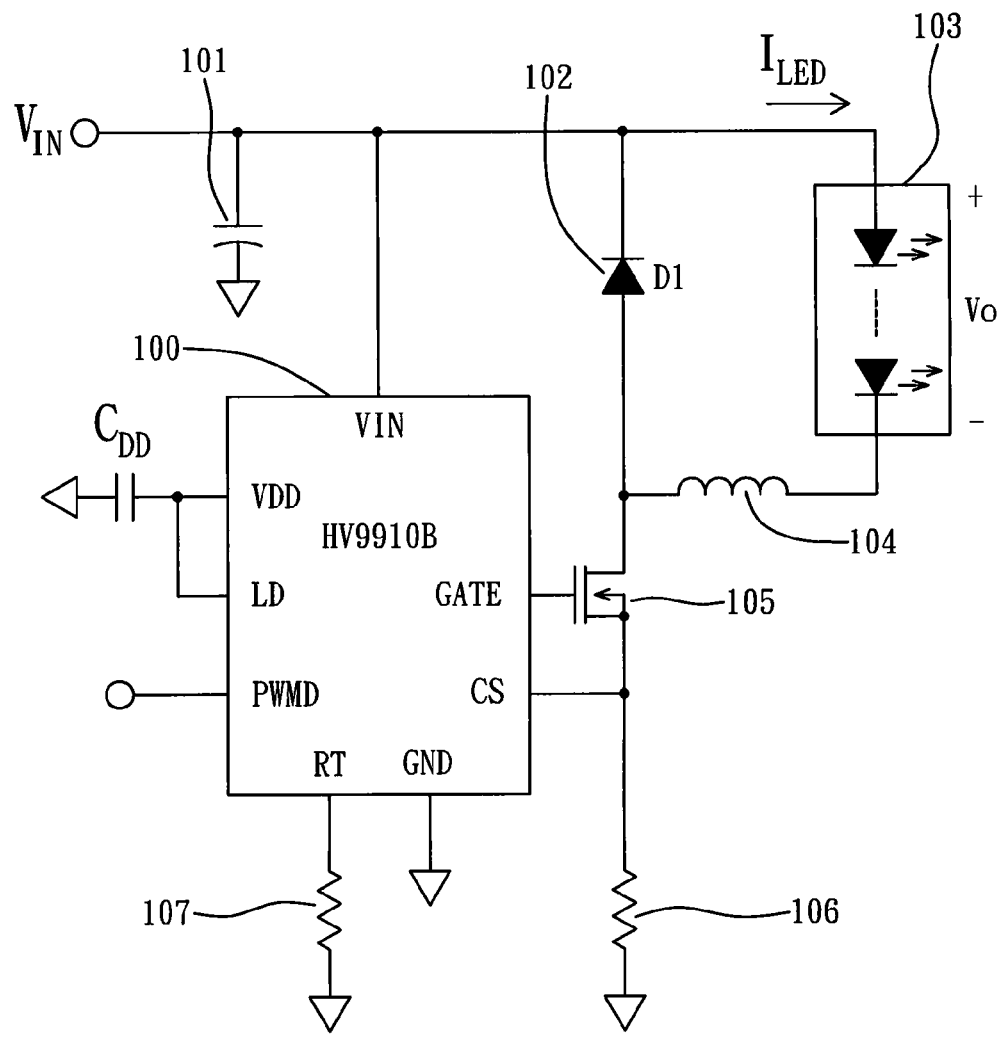
FIG. 1 is the architecture of a prior art open loop LED driving circuit.
Figure 2:
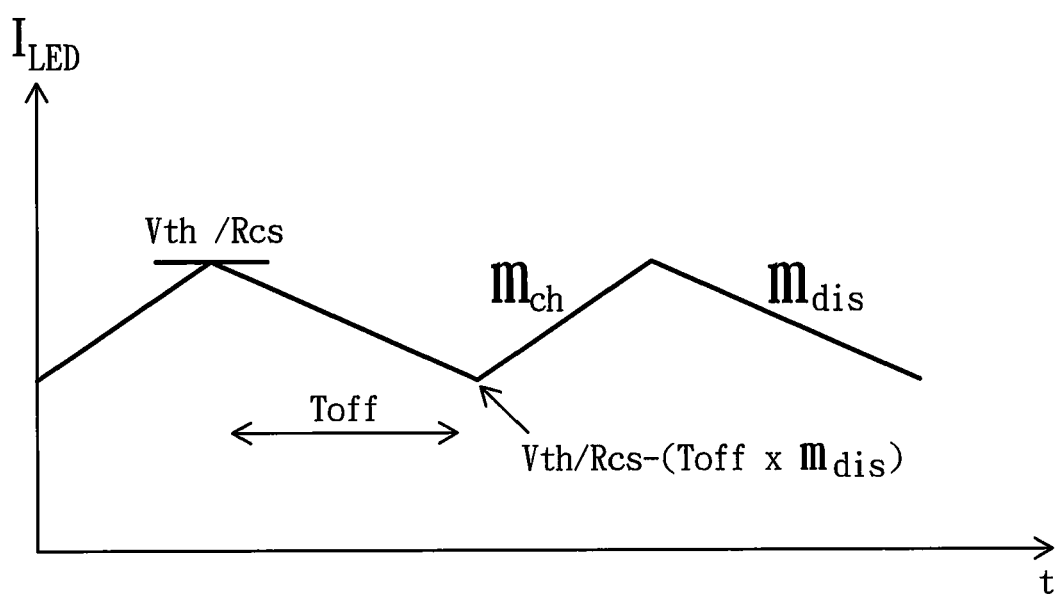
FIG. 2 is the waveform diagram of the LED driving current $I_{LED}$ of the prior art open loop LED driving circuit in FIG. 1, corresponding to a voltage source $V_{IN}$.
Figure 3:
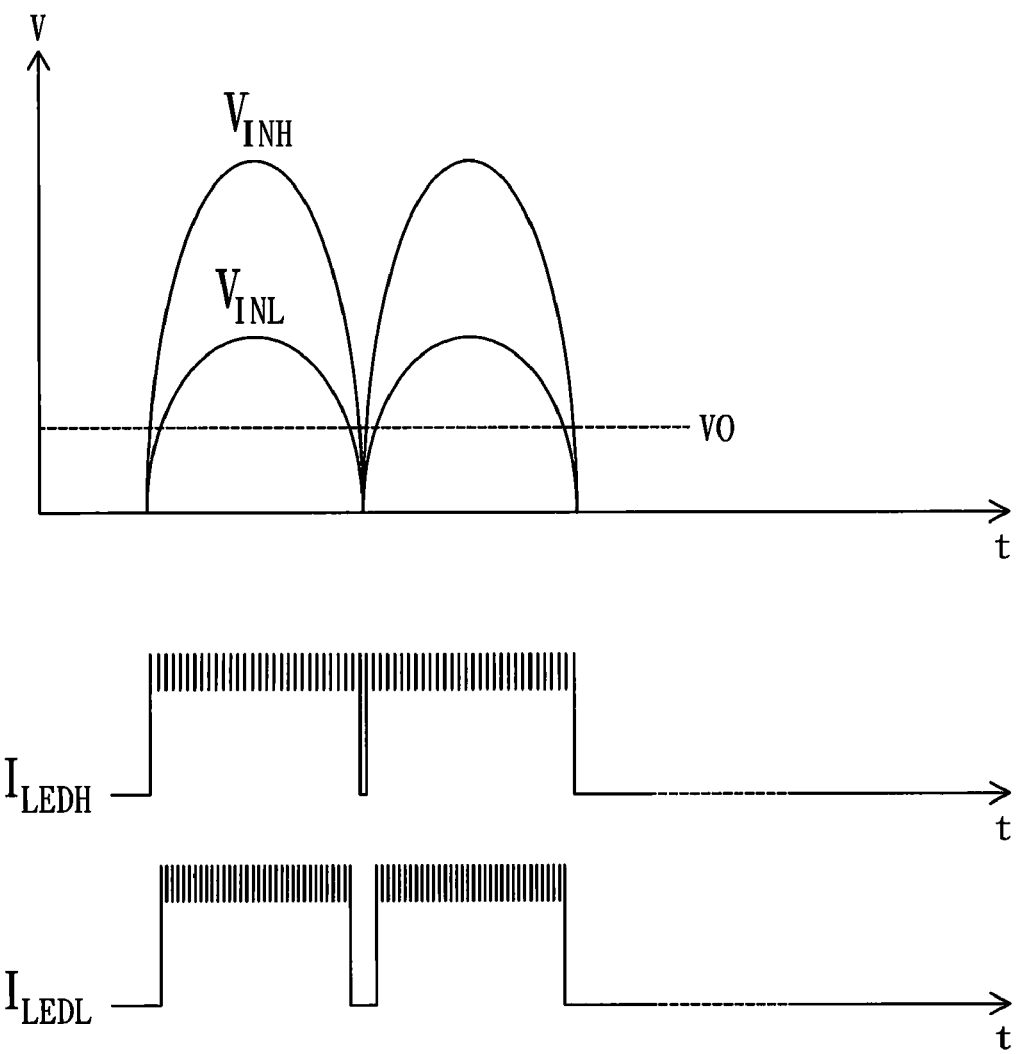
FIG. 3 is the waveform diagram of a LED driving current $I_{LEDH}$ corresponding to a higher voltage source $V_{INH}$ compared with another LED driving current $I_{LEDL}$ corresponding to a lower voltage source $V_{INL}$.
Figure 4:
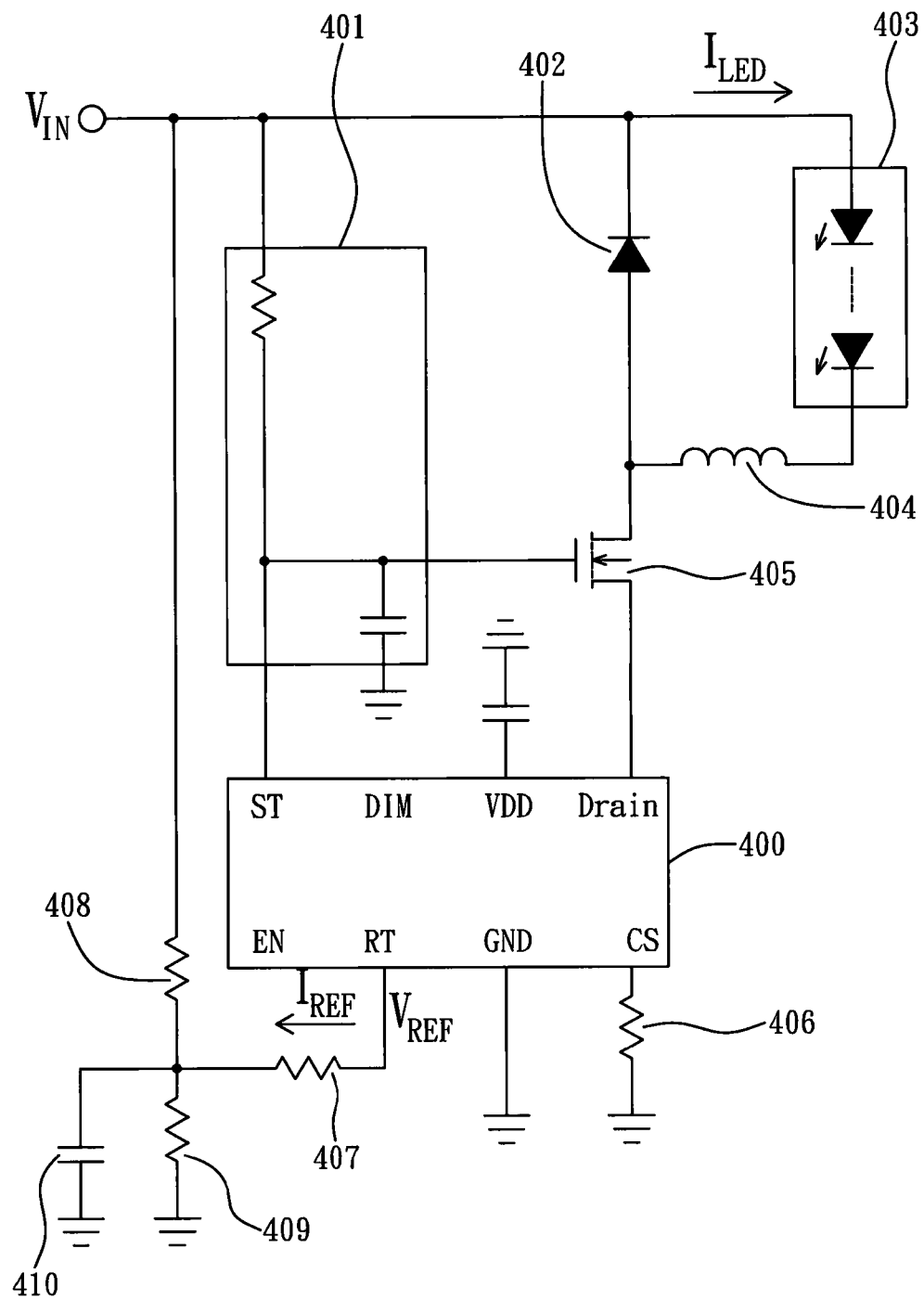
FIG. 4 is the circuit diagram of an open loop LED driving circuit according to a preferred embodiment of the present invention.

Please refer to FIG. 4, which shows the circuit diagram of an open loop LED driving circuit according to a preferred embodiment of the present invention. As shown in FIG. 4, the open loop LED driving circuit includes a PWM controller 400, a start-up circuit 401, a diode 402, a LED module 403, an inductor 404, an NMOS transistor 405, resistors 406~409 and a capacitor 410.

The PWM controller 400 mainly has an ST pin coupled to the start-up circuit 401, a Drain pin coupled to the NMOS transistor 405, a CS pin coupled to the resistor 406, and an RT pin coupled to the resistor 407, wherein the ST pin is used to receive the power from a voltage source $V_{IN}$ through the start-up circuit 401; the Drain pin and the CS pin serve as a first terminal and a second terminal of a channel, of which the conduction is controlled by a gating signal to exhibit a turn-on period and a turn-off period; and the RT pin is used to provide an outlet for a reference current to determine the turn-off period of the channel.

The start-up circuit 401, coupled between the voltage source $V_{IN}$ and the ST pin, is used to provide a start-up current path for the PWM controller 400 to start operation.

The diode 402 is used for releasing the magnetic flux in the inductor 404 to drive the LED module 403.

The LED module 403 is the load of the open loop LED driving circuit.

The inductor 404 is used for carrying the magnetic flux to provide a current $I_{LED}$ to drive the LED module 403.

The NMOS transistor 405 is used to protect the PWM controller 400 in that when the voltage source $V_{IN}$ falls below a minimal operable level of the PWM controller 400, the NMOS transistor 405 will be switched off and thereby prevents the damage of the channel below in the PWM controller 400.

The resistor 406, connected between the CS pin and a reference ground, is used for converting the current, which corresponds to the magnetic flux being stored in the inductor 404, to a current sensing voltage at the CS pin when the channel in the PWM controller 400 is during a turn-on period.

The resistors 407~409, coupled between the voltage source $V_{IN}$ and the RT pin, are a resistive network used to adaptively adjust a reference current $I_{REF}$ according to the voltage of the voltage source $V_{IN}$ in the following way:

$I_{REF} = [V_{REF} - V_{IN} \times \text{resistance of the resistor } 409/(\text{resistance of the resistor } 408 + \text{resistance of the resistor } 409)]/\text{resistance of the resistor } 407,$ wherein when the voltage source $V_{IN}$ is changed to a higher one, the reference current $I_{REF}$ will be decreased to a smaller one. The reference current $I_{REF}$ is then used to determine the time of the end of the turn-off period in a way that the smaller the reference current $I_{REF}$ is, the later the end of the turn-off period will be. As the average level of the driving current $I_{LED}$ can be pulled down by extending the turn-off period, therefore by selecting proper resistances of the resisters 407~409, the variations of the average of the driving current $I_{LED}$ due to line voltage variations can be compensated accordingly. That is, for any specific application, there should be a corresponding resistances combination of the resistors 407~409 to regulate the average of the driving current $I_{LED}$ at a constant level. To have a better signal quality, the capacitor 410 is coupled between the resistive network and the reference ground to filter out the noise.

Figure 5:
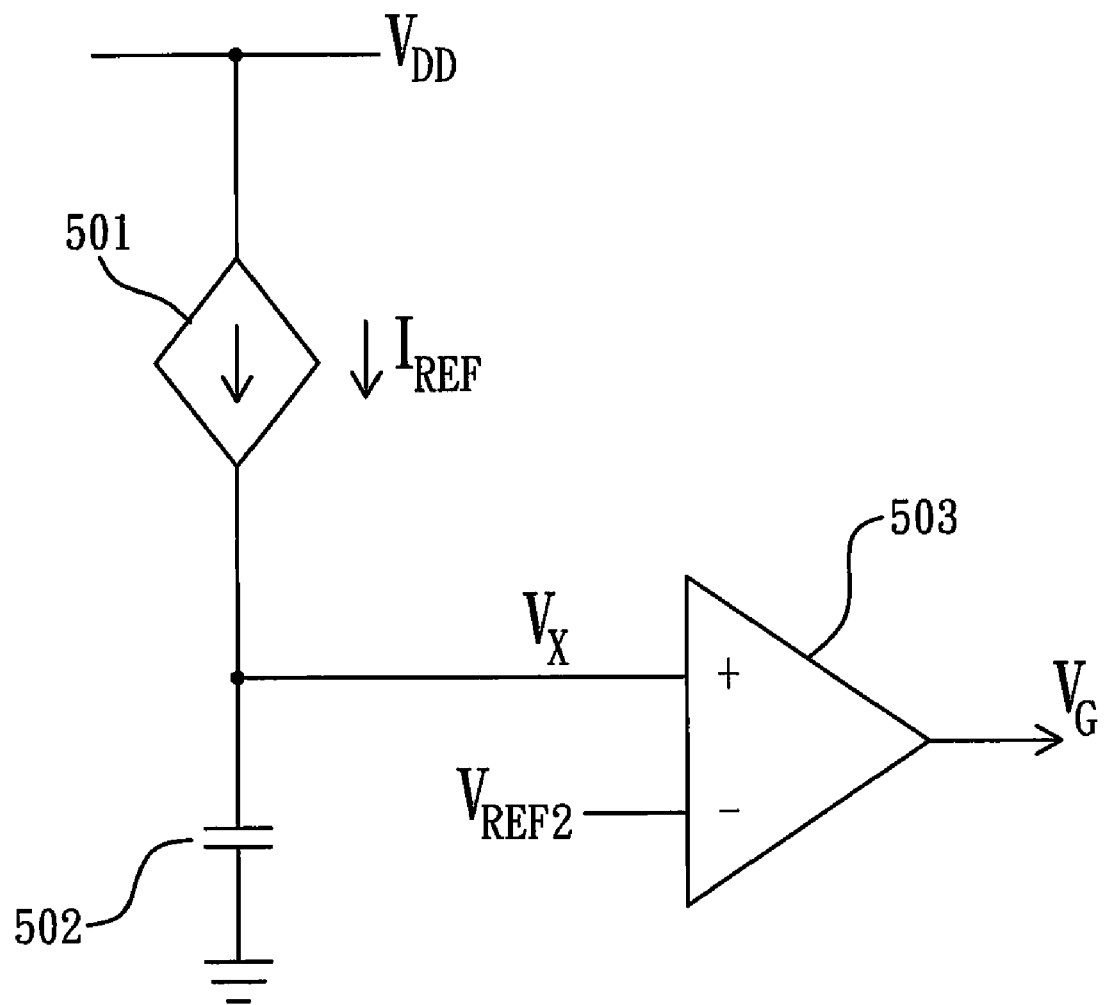
FIG. 5 is the block diagram of an apparatus according to a preferred embodiment of the present invention, for determining the turn-off period of a power MOSFET.

Please refer to FIG. 5, which shows the block diagram of an apparatus according to a preferred embodiment of the present invention, for determining the turn-off period of a power MOSFET. As shown in FIG. 5, the apparatus at least includes a dependent current source 501, a capacitor 502 and a comparator 503.

The dependent current source 501, coupled between $V_{DD}$ and the capacitor 502, is used to provide a current of $I_{REF}$ to charge the capacitor 502 to build up a voltage $V_X$.

The comparator 503 has a positive input terminal coupled to the voltage $V_X$, a negative input terminal coupled to a reference voltage $V_{REF2}$, and an output terminal for generating a gating signal $V_G$ to turn on the channel when the voltage $V_X$ exceeds the reference voltage $V_{REF2}$. As the AC line voltage is changed to a higher one, the voltage of the voltage source $V_{IN}$ will be increased, the $I_{REF}$ will be decreased, the voltage $V_X$ will be charged up slower, the resulted gating signal $V_G$ will have a longer low level period and so a longer turn-off period, and the average level of the LED driving current will be pulled down to compensate the increment of the LED driving current due to the increased voltage source and then have a constant average driving current.

In short, the present invention offers an adaptive turn-off period adjusting means to regulate the open loop LED driving current. The turn-off period is prolonged when the line voltage is changed to a higher one, and the adaptive adjustment can be accomplished by adjusting the resistances of a resistive network. Therefore the present invention does improve the performance of the open loop LED driving circuits and is worthy of being granted a patent.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. An open loop LED driving circuit, having a turn-on period and a turn-off period, said circuit comprising:
 a power stage, used to store a magnetic energy supplied from a voltage source during said turn-on period and deliver said magnetic energy to a set of LEDs during said turn-off period; and
 a control unit, having a turn-off period control terminal coupled to said voltage source, and a channel of which a first terminal is coupled to said power stage and a second terminal is coupled to a reference ground, wherein said channel is switched on at a time according to the voltage of said voltage source to determine said turn-off period,
 wherein said turn-off period control terminal is coupled to said voltage source via a resistive network so that the increment of said turn-off period caused by a voltage increment of said voltage source is determined by said resistive network.

2. The open loop LED driving circuit as claim 1, wherein said power stage comprises an inductive element and a diode, wherein said diode is used to form a discharging current path for said inductive element during said turn-off period.

3. The open loop LED driving circuit as claim 1, wherein said voltage source is rectified from an AC power.

4. The open loop LED driving circuit as claim 1, wherein an end of said turn-off period occurs later as the voltage of said voltage source increases.

5. The open loop LED driving circuit as claim 1, wherein said second terminal is coupled to said reference ground via a resistor.

6. An open loop LED driving circuit, having a turn-on period and a turn-off period, said circuit comprising:
 a power stage, used to store a magnetic energy supplied from a voltage source during said turn-on period and deliver said magnetic energy to a set of LEDs during said turn-off period;
 a control unit, having a turn-off period control terminal and a channel of which a first terminal is coupled to said power stage and a second terminal is coupled to a reference ground; and
 a resistive network, coupled between said voltage source and said turn-off period control terminal,
 wherein said channel is switched on at a time according to the voltage of said voltage source to determine said turn-off period in a way that the increment of said turn-off period caused by a voltage increment of said voltage source is determined by said resistive network.

* * * * *